United States Patent [19]

DeMarco

[11] Patent Number: 5,303,729
[45] Date of Patent: Apr. 19, 1994

[54] LAWN CARE CHEMICAL DELIVERY DEVICE

[76] Inventor: Peter DeMarco, 4144 Cedar Creek Rd., Boca Raton, Fla. 33487

[21] Appl. No.: 32,974

[22] Filed: Mar. 18, 1993

[51] Int. Cl.⁵ .......................................... B01D 11/02
[52] U.S. Cl. ................................... 137/268; 137/893; 239/318; 422/278; 422/282; 422/283
[58] Field of Search ............... 137/268, 888, 892, 893; 239/317, 318; 422/278, 281, 282, 283

[56] References Cited

U.S. PATENT DOCUMENTS

| | | | |
|---|---|---|---|
| 846,100 | 3/1907 | Ester . | |
| 1,205,513 | 11/1916 | Carlson | 422/282 X |
| 1,681,308 | 8/1928 | Parker | 422/282 |
| 1,769,428 | 7/1930 | Gatchet | 239/318 X |
| 2,869,926 | 1/1959 | Lundquist | 422/282 |
| 3,021,863 | 2/1962 | Low . | |
| 3,803,921 | 4/1974 | Dieterich . | |
| 4,225,085 | 9/1980 | Headen | 239/317 |
| 5,053,206 | 10/1991 | Maglio | 422/278 X |

Primary Examiner—Robert G. Nilson
Attorney, Agent, or Firm—Malin, Haley, DiMaggio & Crosby

[57] ABSTRACT

An automatic fertilizing device for introducing lawn care chemicals such as fertilizer, herbicides, insecticides, and fungicides into a sprinkler system, comprising a container having a control plate insert to divide the container into an upper and lower volume, wherein the container and control plate are mounted to a flow head, such that the flow head controls the amount of chemicals drawn from the container and dispersed into the main water line. This device may also be employed in pool systems for dispersing chlorine.

17 Claims, 6 Drawing Sheets

LAWN CARE CHEMICAL DELIVERY DEVICE

BACKGROUND OF THE INVENTION

1. Field of the Invention

This invention relates generally to a device for introducing lawn care chemicals into an irrigation system, and in particular, to a pressurized container which is compatible with a main water supply line for dispersing fertilizers, herbicides, insecticides, and fungicides through a sprinkler system.

2. Description of the Prior Art

The proper treatment and care of lawns is highly desirable to prevent destruction from insects and deterioration from malnutrition. The mixture and application of treatment solutions, however, is a time consuming procedure that requires close attention to chemical-water ratios and their distribution. Since proper care equates to scheduled maintenance, many lawns and gardens become neglected, resulting in unnecessary refurbishing costs. Moreover, lawns, gardens, and vegetation still fall victim to improper maintenance, despite consistent care when poorly balanced solutions are administered.

The prior art contemplates numerous devices for dispersing materials that tend to be too complicated, ineffective, or expensive to be commercially reasonable. U.S. Pat. No. 5,010,913, issued to Riding, teaches a water treatment device for dissolving solid water soluble chemicals, such as fertilizers, into an irrigation system. The Riding device directs water into an upright container having an inlet pipe located above an outlet pipe, wherein both pipes are tied into the supply line. The supply pipe directs a stream of water into the container, over pellets, and back into the main line. This device, however, is only designed for solid chemicals, is easily clogged, and maintains no feature for controlling concentration. As a result, lawns are susceptible to inadequate protection from solutions that are too diluted and to damage from highly concentrated solutions.

The fertilizer container disclosed in U.S. Pat. No. 4,750,512, issued to Craig, feeds water from a supply line into the top of a fertilizer container, downwards over the fertilizer, and through an outlet bore. However, the outlet perforations disclosed in Craig easily clog, causing non-uniform flows of fertilizer are released from the container.

U.S Pat. No. 4,898,202, also issued to Craig as a continuation-in-part of U.S. Pat. No. 4,750,512, introduces a fertilizer container for sprinkler systems that employs an external container, a pressurized chamber, and a plurality of tubes. Water percolates through the chamber and over the fertilizer, lifting a concentrated solution upward then down through tubes and into an outlet bore. Unfortunately, undissolved particles clog the tubes or even pass through the tubes, allowing undiluted chemicals to burn vegetation. Furthermore, since this system passes water directly through the fertilizer, it is not adequate for liquid chemicals or for controlling concentrations.

A variety of other systems presently known in the art which have attempted to introduce chemicals into a water supply line have resulted in complicated, awkward, and inefficient design. For instance, U.S. Pat. No. 3,974,847, issued to Hodges, U.S. Pat. No. 3,943,960, issued to Syrenne, U.S. Pat. No. 3,118,462, issued to Pannutti, and U.S. Pat. No. 1,855,323, issued to Sirch incorporate complex valves, intricate linkages, and expensive fittings to disperse and apply chemicals. These designs employ an overabundance of hardware which increase manufacturing cost, consumer price, and maintenance fees. Furthermore, these complicated designs tend to be unreliable and inefficient. As a result, the foregoing have met with little consumer approval.

While the aforementioned devices disclose various designs to introduce water solvent chemicals into a main water line, no such device teaches the benefits of a low profile design capable of accurately introducing chemicals into a water sprinkler system for distribution in lawn care. Furthermore, these devices tend to concentrate only on solid additives that do not always adequately dissolve and that tend to cause blockage. Therefore, there exists a need for a system that automatically filters fertilizers, herbicides, insecticides, and fungicides into a sprinkler system in a convenient, efficient manner. This invention is intended to address and solve these problems, which are not adequately resolved by the prior inventions.

SUMMARY OF THE INVENTION

The present invention incorporates a container, a control plate, and a flow head, all of which act together to draw chemicals from the container into a mixing chamber delivering consistent concentrations out the flow head and into a sprinkler system. The container has internal threads at its open end which mount to the flow head, and a control plate insert which partitions the container into a lower and upper volume, separating its chemical contents in the lower volume from the flow head. A mixing chamber is the volume defined by the control plate and the flow head in the upper volume of the container. Solution mixed in the mixing chamber is drawn out of the mixing chamber through an exit port, into the water supply passing through the flow head and out into the sprinkler system. The container is filled with chemicals by unscrewing the container from the flow head, removing the control plate, and filling the container with the desired chemicals. The control plate used is dictated by the type of dispersal required and the contents to be siphoned from the container. Thus, the user chooses a control plate, places it in the container, and mounts the container to the flow head.

Water is supplied by a main water line, wherein it enters the flow head through a flow aperture and passes over a foil or barrier that is positioned normal to the water flow. A pressure gradient is created by the fluid flowing over the foil, thereby diverting a stream of water through an intake port into the mixing chamber. Chemicals in the container are siphoned through tubes pending downward from the control plate into the mixing chamber. The pressure gradient causes this siphoning effect.

Communication between the flow aperture and mixing chamber is further effectuated by an exit port. The exit port depends normal to the foil, which partially circumscribes the opening of the exit port in the flow aperture. A venturi effect is induced by the positioning of the foil above the exit port in the flow aperture, such that a high pressure is created, causing solution in the mixing chamber to be sucked up the exit port into the flow aperture as water passes over the foil. The pressure and suction acting on the exit port when drawing solution from the mixing chamber is effected by the size of the foil, given a constant flow. That is, the cross sectional area of the throat above the foil decreases as the surface area of the foil increases, resulting in a decrease in pressure and greater suction. Hence, while high pressure downstream of the exit port causes a diversion of water into the intake port, low pressure at the foil draws the mixed solution in the mixing chamber up through the exit port. The flow of solution from the mixing chamber into the main flow line is also dictated by the diameter of the ports. Therefore, a lever operated valve is operatively associated with the exit port to meter the dispersal of chemical solution into the flow aperture.

The receipt of chemicals by the mixing chamber from the container is controlled by the control plate. The control plate has portions defining siphon apertures and feed apertures. A plurality of siphon tubes depend from the siphon apertures into the container in order to facilitate the drawing of chemical fluid from the container into the mixing chamber. The rate at which chemical is siphoned from the container into the mixing chamber is dictated by the number of tubes, the number of feed apertures, and their cross sectional areas. Solution and water that remain in the mixing chamber is recirculated into the container through the feed apertures to replace fluid siphoned through the tubes. Fluid cycled back to the container is returned to the top thereof such that a constant concentration of fluid is dispersed during operation. Left undisturbed, the chemical composition of the fluid percolates to the bottom of the container so that the contents therein do not mix with or dilute the chemical during operation.

Either liquid chemicals or soluble solids and/or crystals may be placed in the container. A different control plate having larger feed apertures are preferably employed when solid additives are incorporated to allow an increased flow of fluid into the container for diluting the solids or crystals. In any event, the net operation of the system is the same.

The size and shape of the control plate, ports, and mixing chamber dictate the fluid flow. In alternative embodiments, flow can be channeled by partitions in the control plate or flow head. For instance, a 90° elbow at the lower end of the intake port would direct flow horizontally. Multiple intake ports and exit ports may also be incorporated in the unit to direct flow in and out of the mixing chamber. Furthermore, various control plates may be employed to cover or expose siphon and feed apertures, depending on the desired application. It should be further noted that the present invention may be used to disperse chlorine in pool systems.

In accordance with the present invention, it is an object thereof to provide a device for introducing lawn care chemicals into a water sprinkler system having a container with a control plate and a flow head mounted to the container to control the dispersal of the chemical and water solution.

An additional object of the instant invention is to provide an automatic chemical dispersing system that disperses an evenly concentrated solution.

Another object of the instant invention is to provide an automatic chemical dispersing system for use with sprinkler systems that disperses liquid chemicals or diluted solutions from soluble solids and/or crystals.

A further object of the instant invention is to provide a device for introducing chemicals into a water sprinkler system wherein the concentration of solutions dispersed is adjustable.

Still an additional object of the instant invention is to provide a low cost and efficient device for introducing lawn care chemicals such as fertilizers, herbicides, fungicides, and insecticides into a water sprinkler system.

Still another object of the instant invention is to provide a device for introducing lawn care chemicals into a sprinkler system that disperses the contents of the device in a desired time allotment.

Yet another object of the instant invention is to provide a device for dispersing lawn care chemicals into a sprinkler system that is adaptable to variable viscosities of fluid concentrate and soluble additives.

Yet a further object of the instant invention is to provide a device for dispersing chlorine into pools.

In accordance with these and other objects which will be apparent hereinafter, the instant invention will now become described with particular reference to the accompanying drawings.

DESCRIPTION OF THE PREFERRED EMBODIMENTS

Figure 1:
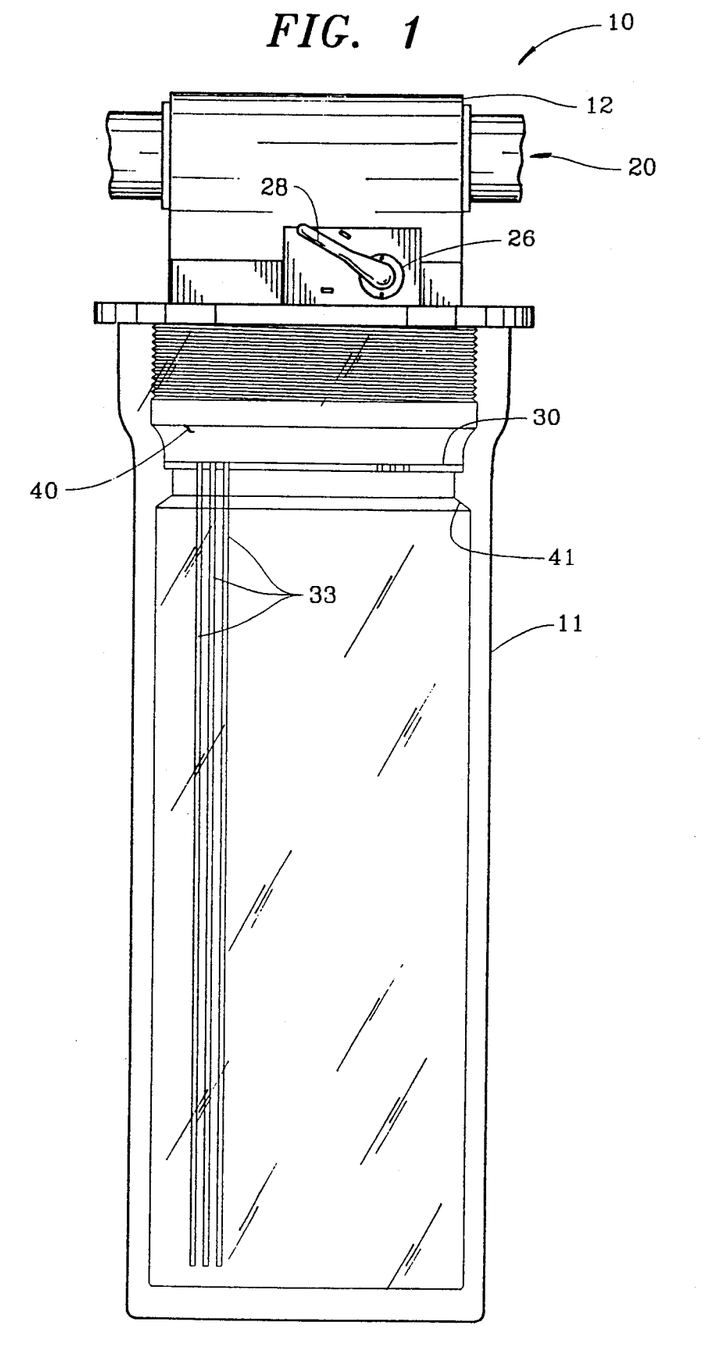
FIG. 1 is a perspective view of the preferred embodiment of the instant invention, illustrating the flow head connected in line with pipe fragments.

With reference to FIGS. 1-11, there is depicted an automatic fertilizing device, characterized by the reference numeral 10, comprising a flow head 12, a container 11, and a control plate 30. The flow head 12 is an in-line dispersal fitting as shown in FIG. 1, which has a container 11 attached thereto for dispersing chemical solutions from the container 11, such as fertilizers, herbicides, fungicides, and insecticides into a water supply line for passage into a sprinkler system. The control plate 30 is a metering device placed in the container 11 dividing the container into an upper and lower volume to control the amount of substance siphoned from the container 11. The space between the flow head 12 and the control plate 30 in the upper volume comprises a mixing chamber 40, wherein diverted water is combined with chemicals siphoned from the container 11 and introduced into the main water line passing through the aperture 20 of flow head 12.

Figure 2:
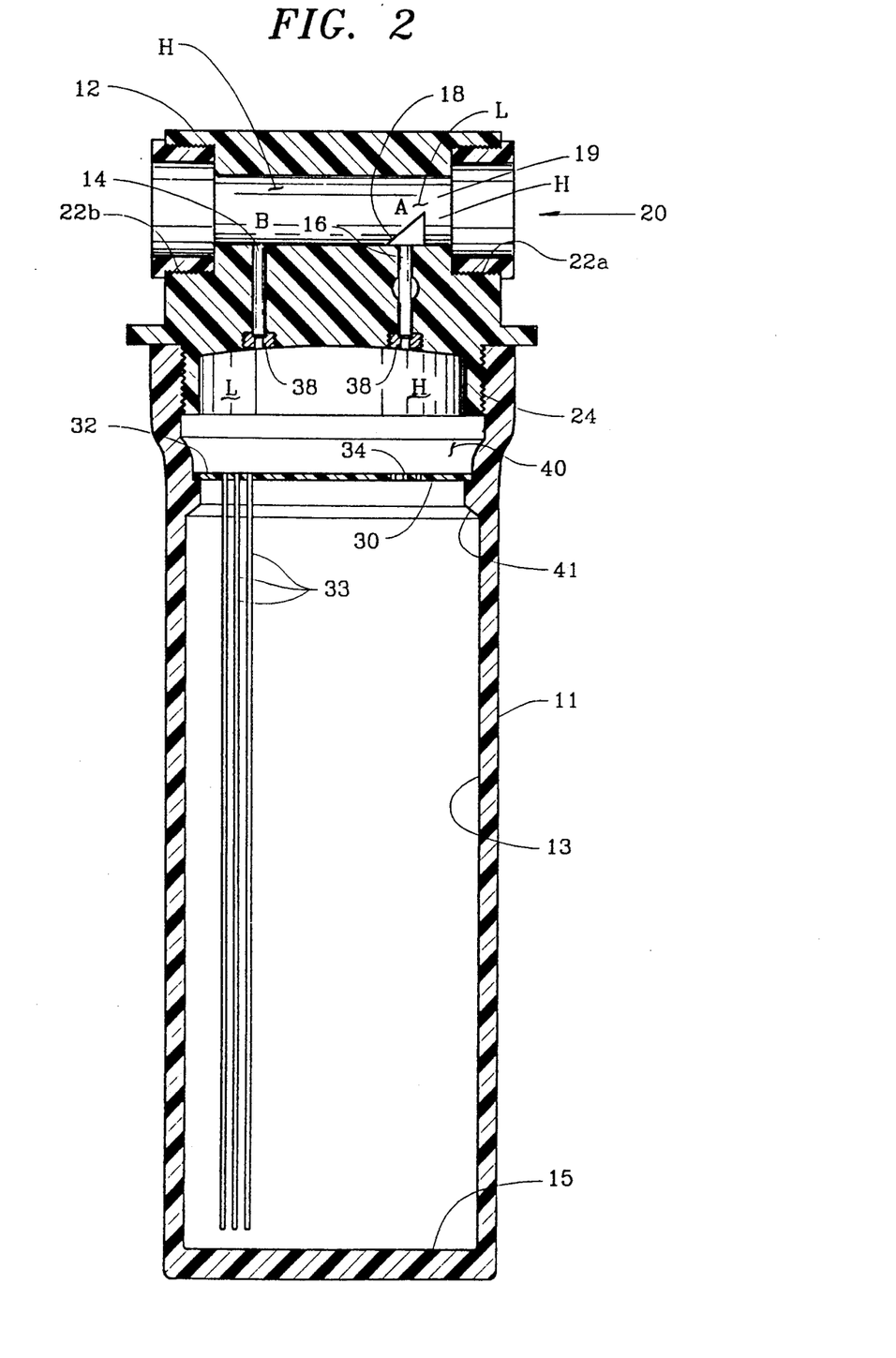
FIG. 2 is a cross sectional view of the preferred embodiment, illustrating the container, control plate, mixing chamber, and flow head connections.

In the preferred embodiment, container 11 is an elongated, vertically oriented, cylindrical chamber having clear or opaque walls that converge or taper slightly towards the base 15. Container 11 defines an upper peripheral opening having preferably an elliptical or circular cross section with internal threads for mating with collar 24 of flow head 12. Control plate 30 rests on a ridge 41 which circumscribes the interior wall of container 11, and is retained in place as it securedly hugs the interior walls 13 of the container 11. The ridge 41 may be secured to or integrally combined with the interior wall 13, and may be continuous or disjunctive in structure, and still fall within the scope of the invention. In an alternative embodiment, the tapered design of container 11 provides lateral frictional support against control plate 30 to secure it therein. With the control plate 30 inserted, container 11 is mated with vertical collar 24 of flow head 12 as shown in FIG. 2.

Figure 8:
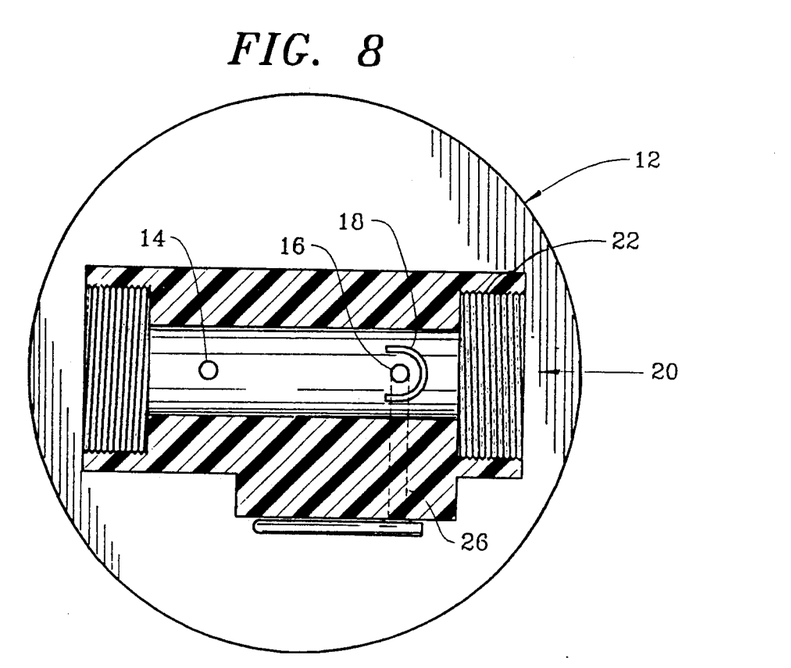
FIG. 8 is a cross section of the flow head taken along line 8—8 of FIG. 4.

Flow head 12 contains female threaded ports 22a and 22b for secure attachment to a water supply line illustrated in FIG. 1. Flow head 12 provides a continuous flow aperture 20, having an inlet and outlet, which allows the passage of fluid from point A to point B. As fluid enters port 22a, it passes over a foil 18. Foil 18 protrudes upwardly from the bottom surface of flow aperture 20 in the vicinity of point A, such that it provides a barrier normal to the flow therethrough. Foil 18 may be secured to, or integrally formed with flow head 12. A side cross sectional view of flow head 12 reveals the downward slope of foil 18 over exit port 16, such that a throat 19 is formed at point A. A sectional view as in FIG. 8 illustrates that the foil 18 partially circumscribes the exit port 16. The throat 19 is instrumentally important to the function of the present invention, as will be described hereinafter in greater detail.

Figure 5:
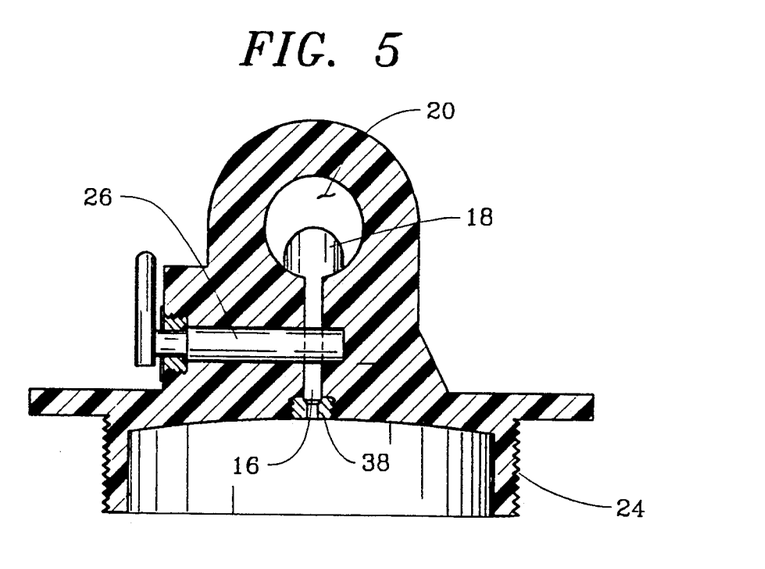
FIG. 5 is a cross sectional view taken along line 5—5 of FIG. 7.
Figure 6:
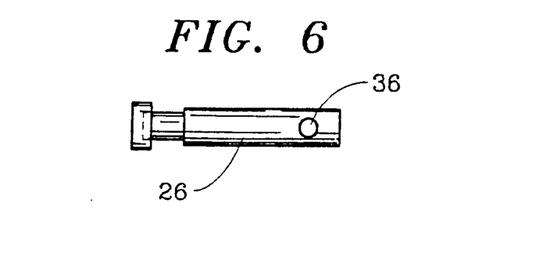
FIG. 6 is a detailed view of the lever.
Figure 7:
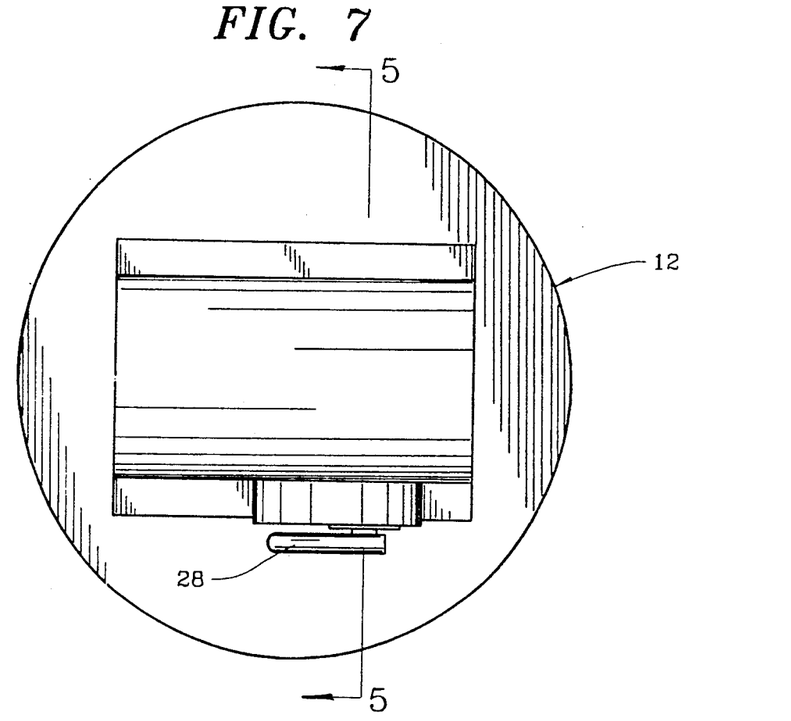
FIG. 7 is a plan view of the instant invention.

Flow head 12 also has portions defining intake port 14 and exit port 16 which provide apertures for fluid communication with the mixing chamber 40 and container 11. Jets 38 at the lower ends of intake port 14 and exit port 16 provide smaller diameters in the ports to accelerate the passage of fluid into and out of mixing chamber 40, thereby providing compensation for variations in pressure, volume, etc. of the existing water supply. Exit port 16 intake port 14 vertically define reference points A and B, respectively, in flow aperture 20. Normal and diametrically opposed to exit port 16 is a valve 26 which controls the passage of fluid through said port 16 via the fluid passage 36 as seen in FIGS. 5 and 6. This valve 26 dictates the concentration of solution that passes into flow aperture 20 by controlling the level of chemical that passes through exit port 16. Likewise, the cross sectional area of intake port 14 and exit port 16 affect the amount of fluid entering and exiting the mixing chamber 40, respectively. Pending vertically downward from flow head 12 is vertical collar 24. Vertical collar 24 has external threads formed thereon, which mate with threads in container 11.

Figure 3:
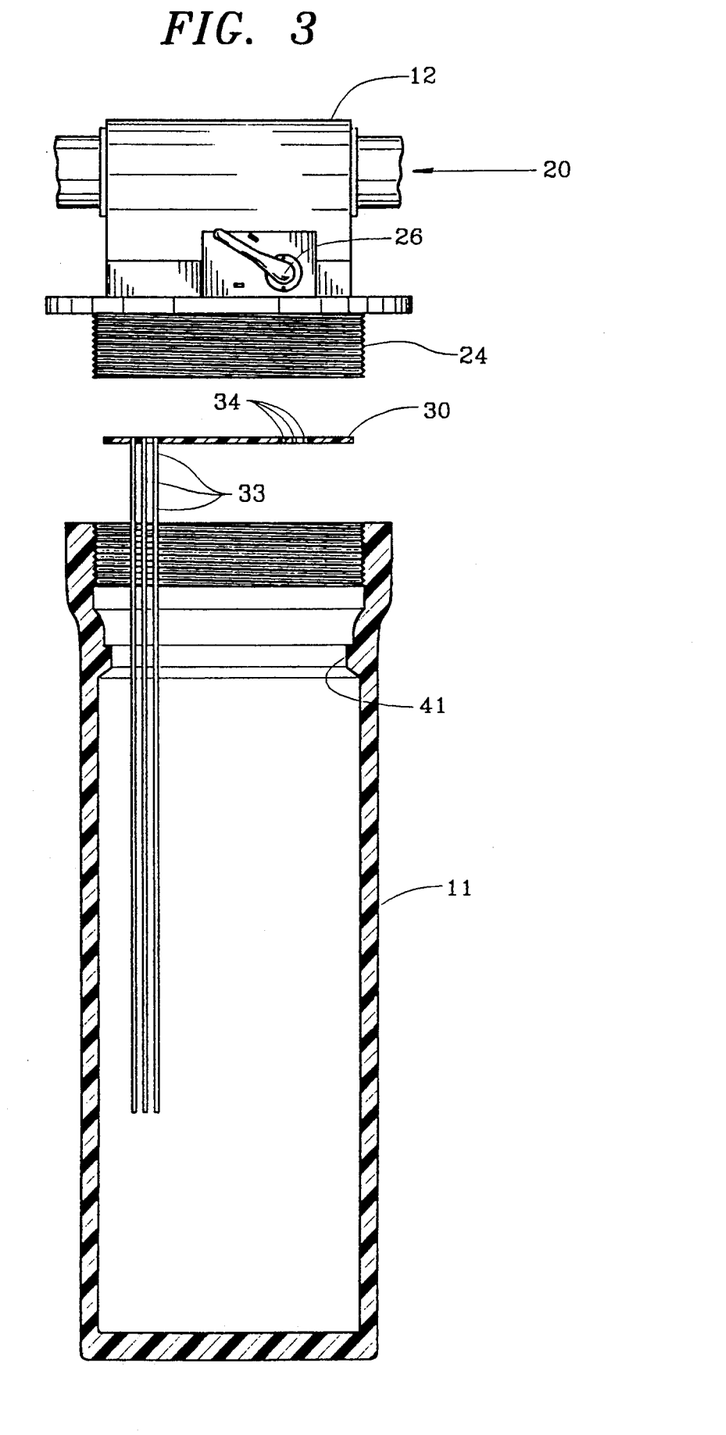
FIG. 3 is an exploded view of the instant invention, shown cross sectionally.
Figure 4:
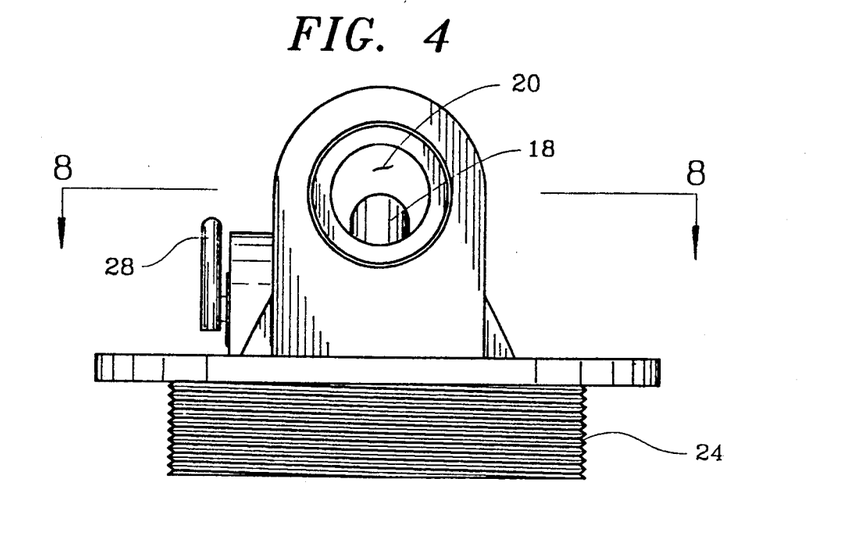
FIG. 4 is an end view of the flow head of the instant invention, illustrating the lever, and foil disposed in the flow aperture.
Figure 9:
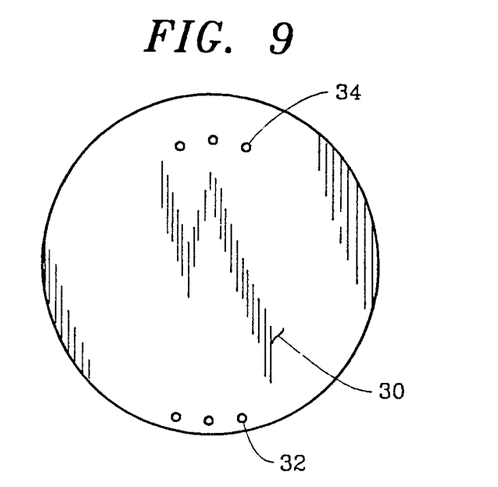
FIG. 9 is a plan view of the control plate.

A control plate 30 is illustrated in FIG. 9, which has a plurality of apertures therethrough. These apertures define the feed passages 34 and the siphon passages 32 for allowing the dispersal of chemicals from container 11. A plurality of siphon tubes 33 depend from control plate 30 which may be secured to or integrally combined with control plate 30 as seen in FIGS. 2 and 3. Siphon tubes 33 may also be integrally combined with container 11 and still fall within the scope of the present invention. The rate at which the chemical is dispersed from container 11 is metered by the inside diameter and number of siphon tubes 33. The feed passages 34 in control plate 30 afford the suction of solution through tube 33 and the passage of fluid into container 11 to replace solution dispersed through the siphon tubes 33 into the mixing chamber 40. The cross sectional area of the feed passages 34 also control the level of chemicals dispersed, however, the diameter of the feed passages 34 is typically smaller than that of the siphon apertures 32 when the chemical contents of container 11 is a liquid. When soluble additives are used, the feed passages 34 tend to be larger to allow the intake of water into container 11 for dissolving the contents, thereby affording a soluble solution for suction. Siphon tubes 33 may or may not be used with solid chemicals. Additionally, a plurality of control plates 30 having different arrangements of apertures 32 and 34 for exposing or covering passages may be selected from for different applications.

In an alternative embodiment, the flow head 12 remains in line with the water supply line, but detached from container 11. See FIG. 11. By offsetting the flow head 12, container 11 may be placed in more convenient locations for the monitoring and refilling of chemicals. Offsetting the flow head 12 allows for greater versatility in that larger size pipe installations are possible, and also allows the flow head to be disposed vertically. The flow head 12 and container 11 maintain communication by extending the intake and exit ports 14 and 16, respectively, with flexible tubing, while the mixing chamber remains with the container. Valve 26 may remain with the flow head 12, but may also be located with the container. The operation of the system remains as aforementioned.

To utilize the instant invention, the container 11 is filled with the desired chemical and a control plate 30 is selected for placement in the container 11. Subsequently, the container 11 is attached to the flow head 12 and the water supply is actuated. The flow head 12 should already be attached in the water supply line before mounting the container 11. Water from the supply source, when turned on, passes through the flow aperture 20 and over the foil 18 at point A. A pressure gradient is created by the fluid flowing over the foil 18, wherein the fluid adjacent the foil, and the fluid above the apex of the foil, generally at point A, is at a relatively high pressure, as referenced by the letter "H" in FIG. 2, and wherein areas of relatively low pressure, as referenced by the letter "L" in FIG. 2, are correspondingly created. Because of the pressure gradient created, and the low pressure immediately above the exit port 16, a vacuum is created, causing a flow out of mixing chamber 40. The lower pressure causes a portion of the fluid to be diverted through the intake port 14 into the mixing chamber 40, commingled with chemicals drawn from the container 11, and sucked through the exit port 16 back into the water supply flowing through the flow aperture 20. The water base or petroleum base chemical solution is then carried out into the sprinkler system where it is dispersed accordingly.

The operation of the present invention is based on the principal that different flow velocities produce different amounts of suction, wherein such velocities are inversely proportional to the area of passage. Reducing the cross sectional area normal to flow increases the velocity of water flow through the restriction, thereby creating lower pressure as water flows past the restriction. In light of this principal, the flow head 12 comprises a flow aperture 20 having a foil 18 at the forefront to form a constriction or throat 19 such that when water passes through the throat 19, the flow velocity is increased, creating a lower pressure at point A. Thus, the flow velocity is higher at point A than at point B, producing a suction or vacuum at point A as described above. The excess pressure and the suction act on the mixing chamber 40, as well as on the container 11, to draw fluid from the mixing chamber 40 through the exit port 16 and into the flow aperture 20. Accordingly, the pressure at point B causes a stream of water to pass through the intake port 14 into the mixing chamber 40, fluid from the container is simultaneously drawn through the siphon tubes 33 into the mixing chamber 40, joined with water therein and removed through the exit port 16. Fluid not siphoned by the exit port 16 returns to the container 11 via the feed passages 34 to rest on the contents therein to maintain a constant concentration. If solid additives are used, then a control plate 30 having larger feed passages may be utilized so that more fluid will enter the container 11 to dissolve the soluble additives.

The rate at which the contents of the container 11 are dispersed into the mixing chamber 40 is controlled by the cross sectional area of the tubes 33 and feed passages 34, as well as by their number. Solution drawn from the mixing chamber is metered further by the valve 26 as it is disposed in exit port 16.

Figure 10:
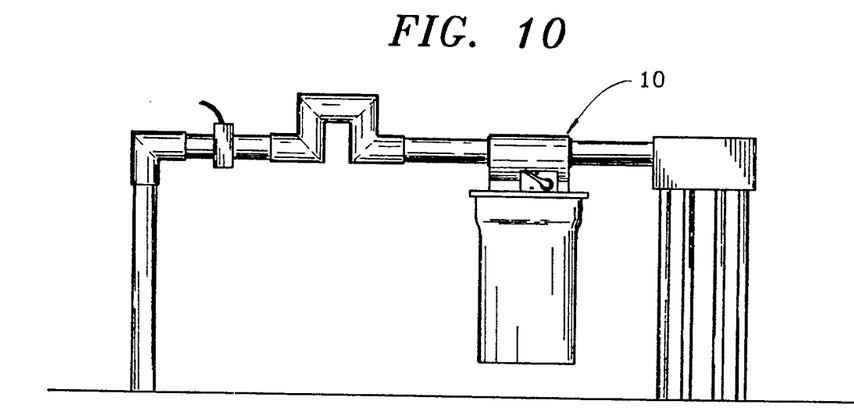
FIG. 10 is an illustration of the typical installation of the preferred embodiment.
Figure 11:
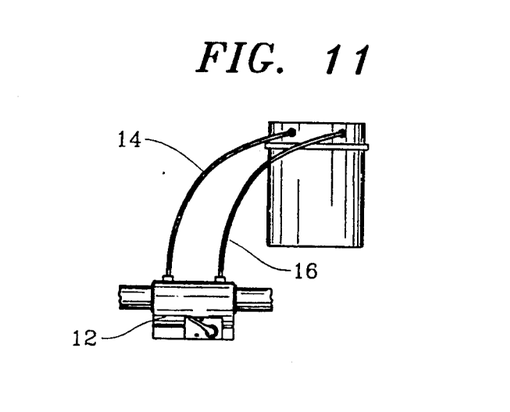
FIG. 11 is an illustration of an alternative installation of the preferred embodiment with the flow head offset from the container while remaining in line with a sprinkler system.

The typical installation of this automatic fertilizing device is shown in FIG. 10, wherein the flow head with the container attached is connected in line with a main water supply. The typical sprinkler system also includes a conventional index valve having zone feed pipes for controlling the operation of the different sprinkler zones. A siphon break, an electric solenoid, and the water supply are also connected in line with the index valve and the fertilizing apparatus. In an alternative embodiment, as shown in FIG. 11, the flow head containing the foil and metering valve may be attached in line with the water supply line, but offset from the container. Fluid communication between the container and flow head is maintained by extending the intake and exit ports with flexible tubing. The operation of the apparatus remains the same as described above, wherein a low pressure forces a diversion of water out of the mixing chamber and a high pressure at the foil causes the suction of solution back into the flow aperture. It should be further noted that the chemical dispersing unit disclosed in this application may also be used for metering and controlling the dispersement of chlorine into pool filtration systems.

In alternative embodiments, the mixing chamber, ports, and apertures may be varied in size and shape to affect the flow through the mixing chamber and the rate of dispersal. Flow can be channeled by partitions or elbows to direct flow. Multiple intake and exit ports may also be strategically placed in the unit to direct the flow in and out of the mixing chamber.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An apparatus for automatically dispersing chemicals into a main water supply for dispersement in lawn care or pool care, comprising:
   a container means for holding chemicals to be dispersed, said container having an open top end;
   a partition means disposed in said container, said partition means dividing said container into an upper volume and lower volume;
   a flow head means attached to said container for receiving water from the main water supply, said flow head means defining an intake port;
   a mixing chamber defined by the space between the said flow head and said partition means;
   said intake port for providing fluid communication between said flow head means and said mixing chamber such that a stream of water flowing through the flow head is diverted from said flow head into said mixing chamber through said intake port;
   a siphoning means providing fluid communication between said container and said mixing chamber, wherein said siphoning means siphons chemicals from said container into said mixing chamber for mixing with water in said mixing chamber; and
   a suction means disposed in said flow head means for sucking the solution from said mixing chamber into said flow head means, such that said flow head means dispersing the solution into the main water supply line.

2. An apparatus according to claim 1, wherein said container means further includes a partition support means disposed in said container for supporting said partition means in said container.

3. An apparatus according to claim 1, wherein said flow head means further includes a flow aperture concentric with the main water supply line for receiving water and for dispersing solution received from said mixing chamber into said main water supply line.

4. An apparatus according to claim 1, wherein said flow head means further includes an exit port for receiving solution from said mixing chamber and passing solution into the main water supply line.

5. An apparatus for automatically dispersing chemicals into a main water supply line for dispersement in lawn care or pool care, comprising:
   a container means for holding chemicals to be dispersed, said container having an open top end;
   a partition means disposed in said container, such that said container is divided into an upper volume and a lower volume, wherein said chemicals are contained in said lower volume;
   a flow head means attached to said container, said flow head means having a flow aperture for receiving water from the main water supply line and for dispersing a water chemical solution back into the main water supply line, said flow head means further including an intake port;
   a mixing chamber comprising said upper volume of said container defined by the volume between said flow head and said partition means, said intake port providing fluid communication between said flow aperture and said mixing chamber;
   a siphoning means depending from said partition means providing fluid communication between said mixing chamber and said container, wherein said siphoning means siphons said chemicals from said container into said mixing chamber, forming said solution; and
   a suction means disposed in said flow aperture for sucking the solution from said mixing chamber into said flow aperture such that said flow head disperses the solution into the main water supply line.

6. An apparatus according to claim 5, wherein said container means further includes a partition support means disposed in said container for supporting said partition means and said container.

7. An apparatus according to claim 5, wherein said flow head means further includes threaded ports at opposite ends for connection with a main water supply line.

8. An apparatus according to claim 5, wherein said suction means comprises a barrier disposed in said flow aperture and an exit port providing fluid communication between said flow aperture and said mixing chamber, wherein said barrier and said exit port are operatively associated such that the velocity of fluid flowing through said flow aperture increases when passing over said barrier to induce suction of solution from said mixing chamber.

9. An apparatus according to claim 5, wherein said partitioning means comprises a planar plate having a plurality of siphon apertures in communication with said mixing chamber, wherein said siphoning means is concentric with said siphon apertures.

10. An apparatus according to claim 9, wherein said siphoning means comprises a plurality of tubes connected to and depending into said container from said siphon apertures.

11. An apparatus according to claim 5, wherein said suction means further includes a metering means for controlling the amount of fluid sucked from said mixing chamber into said flow aperture.

12. An apparatus according to claim 11, wherein said metering means comprises a valve.

13. An apparatus according to claim 5, wherein said partitioning means further includes a plurality of feed apertures for directing fluid into said container for dissolving solid chemicals held in said container.

14. An apparatus according to claim 5, wherein said apparatus further includes a dilution means for diluting soluble chemicals held in said container for siphoning into said mixing chamber by said siphoning means.

15. An apparatus according to claim 5, wherein said container means is fabricated from clear plastic.

16. An apparatus according to claim 5, wherein said container is fabricated from an opaque plastic.

17. An apparatus for automatically dispersing chemicals into a main water supply for dispersement in lawn care or pool care, comprising:
 a container means for holding chemicals to be dispersed, said container having an open top end;
 a partition means disposed in said container, said partition means dividing said container into an upper volume and a lower volume;
 a flow head means attached to said container for receiving water from the main water supply;
 a mixing chamber defined by the space between said flow head and said partition means;
 a siphoning means comprising a plurality of tubes connected to said partitioning means, said plurality of tubes depending into said container to provide fluid communication between said mixing chamber and said container, wherein said siphoning means siphons chemicals through said tubes from said container into said mixing chamber for mixing with water in said mixing chamber; and
 a suction means disposed in said flow head means for sucking the solution from said mixing chamber into said flow head means, such that said flow head means disperses the solution into the main water supply line.

* * * * *